Jan. 28, 1969

D. D. CALL 3,424,520

PRECESSION INHIBITOR

Filed Oct. 24, 1965

Inventor:
Daniel D. Call.

By Griffin and Branigan
Attys

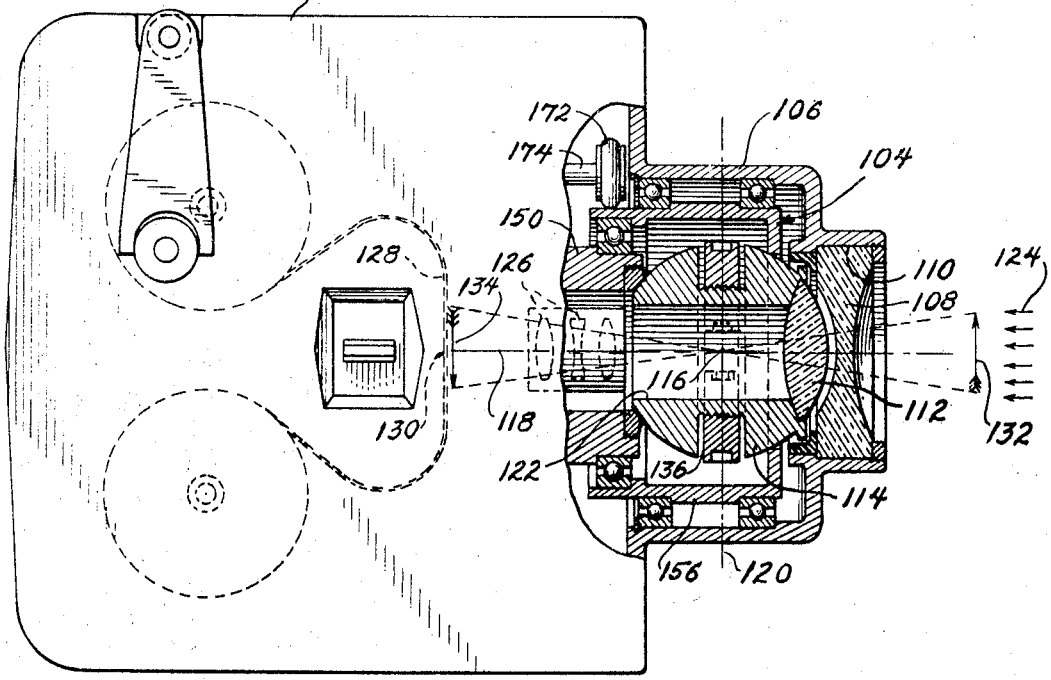
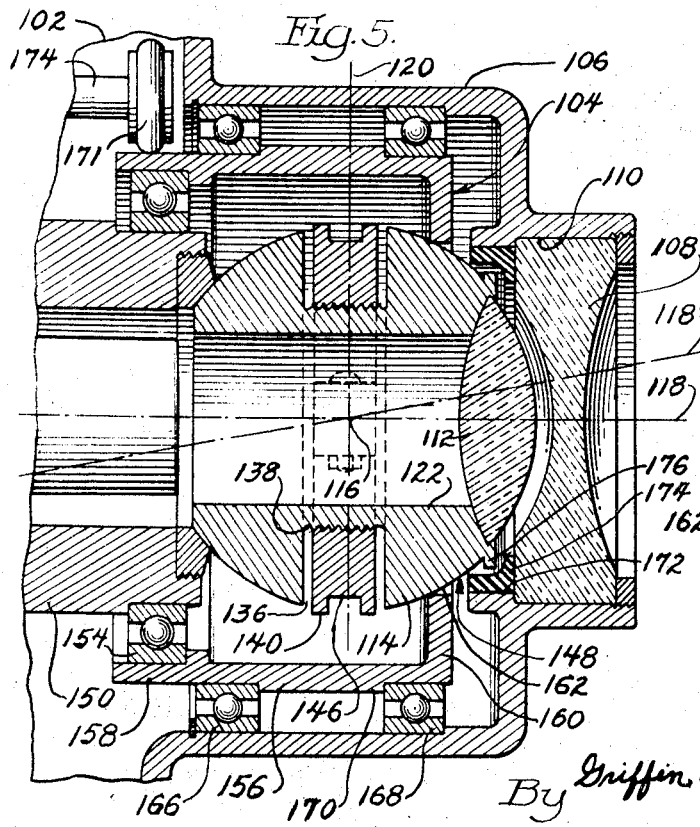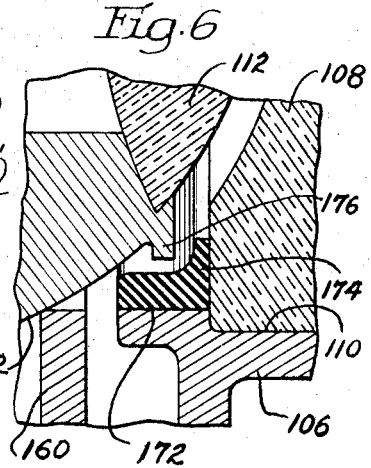

United States Patent Office 3,424,520
Patented Jan. 28, 1969

3,424,520
PRECESSION INHIBITOR
Daniel D. Call, Mount Prospect, Ill., assignor to Bell & Howell Company, Chicago, Ill., a corporation of Illinois
Filed Oct. 24, 1965, Ser. No. 504,507
U.S. Cl. 352—243         17 Claims
Int. Cl. G03b 17/00

ABSTRACT OF THE DISCLOSURE

A movie camera has an optical wedge having one lens thereof spin stabilized within the camera's housing. A soft friction element having a high coefficient of friction is mounted in the path of relative motion between the spin stabilized lens and the housing so that undesirable motion due to precession of the stabilized lens is inhibited when the stabilized lens contacts the friction element.

---

This invention relates to gyroscopes and more particularly to a device for inhibiting undesirable precission in gyro stabilized elements of instruments such as cameras or the like.

Modern instruments frequently have gyroscopically stabilized elements associated therewith. Usually, the gyroscope functions to stabilize particular elements of the instrument with respect to motion of the instrument's housing. In a thusly stabilized instrument the phenomenon of gyroscopic action is also present. That is, the tendency of a rapidly spinning body to turn about a second axis not parallel to the axis of spin, when acted upon by a torque about a third axis. Moreover, the rapidly spinning body tends to move in a direction which is perpendicular to the direction of the force which causes the torque. The reason that the spinning body moves perpendicularly to the direction of the force is because the angular momentum of the spinning body and the torque caused by the force acting upon the body resolve themselves in a direction perpendicular to the force. For example, if an airplane driven by a right-handed propeller is forced to the left by a gust of wind the gyroscopic action of the propeller makes the forward end of the propeller shaft rise. In this example, the airplane's roll axis corresponds to a gyroscope's axis of spin; the craft's yaw axis corresponds to a gyro's torque axis; and the plane's pitch axis corresponds to a gyro's precession axis.

Frequently an instrument's gyroscopically stabilized element undergoes sufficient relative motion with respect to the instrument's housing that it strikes either the housing or some other member of the instrument. When this occurs the spin stabilized element precesses whereby the instrument's intended stabilizing action is destroyed. It is an object of this invention, therefore, to provide a device for inhibiting this type of undesirable precession.

Several types of optical instruments are presently being developed to incorporate stabilized lens elements therein. Cameras, telescopes, and field glasses are examples of some of the optical instruments the lenses of which have been stabilized against vibratory motions of the instrument housing. The benefits of such a stabilized optical instrument can be readily appreciated by considering the case of an optically stabilized camera. When a camera is held in the photographer's hand its lens are generally unavoidably vibrated, thereby resulting in an undesirable image at the camera's focal plane. This is particularly true in the case of a movie camera where vibrations are recorded on successive frames of film which, when magnified during projection, produce a picture which is unpleasant to view and in some instances unintelligible. By stabilizing the camera's lenses this normal jiggle introduced by the photographer has been substantially eliminated. When the photographer's motion of the camera is so great, however, that the stabilized lenses undergo such a degree of relative motion with respect to the camera housing that the lenses strike the housing, the lenses abruptly precess. It is another object of this invention, therefore, to provide a precession inhibitor for a lens stabilization system.

In accordance with the principle of the invention a relatively soft element having a high coefficient of friction is mounted between the instrument housing and the stabilized member. In this manner when the stabilized member comes into contact with the soft friction element or precession inhibitor, it tends to embed itself into the inhibitor rather than precess as has been its shortcoming in the past.

One of the recently developed types of stabilized lens systems obtains its stabilization by means of a Boscovich type of wedge. That is, an optical wedge having a plurality of lens elements adapted so that an image viewed through the wedge remains stable at the focal plane of the wedge irrespective of motion between the wedge elements. A wedge of this type is more fully described and explained in U.S. Patent No. 2,180,017, entitled, "Camera With Range Finder," and issued to Carl Ort on Nov. 14, 1939.

Because of both the relatively delicate nature of optically stabilized instruments and the practicalities of constructing such an instrument the stabilized lenses cannot be permitted to swing completely freely within the instrument. For this reason the instrument is constructed so that the stabilized element or lens is prohibited from swinging through too large an arc. Moreover, as soon as the stabilized element of a Boscovich wedge undergoes a certain degree of relative motion the image transmitted through the wedge becomes subjected to color fringing effects which are equally as undesirable as the jiggle that the system is intended to eliminate. It has been found that when a Boscovich type of wedge is used in a hand held optical instrument such as a movie camera, for example, a 2° angular displacement of one of the lens elements with respect to another is adequate to substantially filter out undesired vibrations. It would appear, therefore, that the color fringing problem could be held to a minimum by limiting the stabilized lens' motion to 2°. When lens motion barriers or stops are constructed so as to permit only 2° of motion, however, the lenses undergo such severe precession during panning that the instrument is not suitable for its intended purpose.

Consequently, although undesired vibrations can be filtered out with only a 2° relative motion of the stabilized lens element, and notwithstanding the rapid decrease in color quality as relative motion of the stabilized lens element increases, it has heretofore been necessary to design instruments so that the stabilized lens underwent a displacement of about 6° one way or the other from the axis of the wedge. In this manner, because there was less likelihood of hitting the lens stops there was also less liklihood that the stabilized element would abruptly and rapidly precess as soon as it did hit a lens stop or the like. Stabilized lenses, therefore, have not had high quality color characteristics. Hence, it is another object of this invention to provide a stabilized lens system that possesses high quality color characteristics. It is a more specific object of the invention to provide a stabilized lens system wherein the motions that give rise to the undesirable color fringing effects are eliminated. In other words, it is a specific object of the invention to eliminate the undesirable precession which heretofore has been eliminated by equally undesirable color fringe producing motion.

According to another aspect of the invention, therefore, a mating lens is mounted in the instrument's housing in front of the stabilized lens so as to form a Boscovich type wedge and a soft friction element is mounted between the stabilized lens and the housing. In this manner the structure of the invention provides both the wedge's image stabilization advantages and an image that is free of color fringing as well as the effects of undesirable precession.

Color fringing effects are also dependent upon the size of the stabilized lens. That is, the larger the lens the greater the amount of motion it can undergo without giving rise to color fringing. Hence, a prior art solution to the poor color quality problem has been to make the stabilized lens considerably larger than it would otherwise need to be. This not only increased the cost of the lens to the point where a consumer type of optically stabilized system became impractical, but insofar as hand held instruments are concerned the size of the stabilized lens and its correspondingly larger stabilization system rendered the structure entirely too large to be of any practical value. For this reason, therefore, it is another object of this invention to provide a stabilized lens system that possesses high quality color characteristics, but is nevertheless suitable for commercial consumer types of products and particularly suitable for small portable types of instruments.

The invention has thus far been discussed in connection with a device for filtering out undesired vibrations such as camera jiggle. In some instances, however, it is highly desirable that the camera's lenses follow motion of the camera housing rather than be spatially stable with respect thereto. When the instrument is relatively slowly rotated such as, for example, when a photographer pans a camera in order to photograph a scene, it is desired that the lens follow the slow motion of the instrument. Consequently, it is desirable that the lens, although stable against undesired vibrations, should within practical limits follow intentional motion of the instrument. Some presently developed devices fulfill this desire quite well, but as a practical matter the stabilized lens always lags behind the instrument's motion. This is particularly so when the photographer pans rapidly. During rapid panning the stabilized lenses undergo such a degree of relative motion with respect to the camera housing that the lenses strike the housing, whereupon the lenses abruptly precess in a direction that is at right angles to the photographer's motion. In this situation, therefore, although the lens stabilization system filters out the undesirable jiggle, it introduces a new lens motion at abrupt right angles to the photographer's panning motion which is equally as undesirable as the jiggle. It is a further object of this invention, therefore, to provide a stabilized lens structure that is permitted to precess so as to follow desired slow motions of the instrument, but which is adapted to inhibit other types of undesirable precession.

In accordance with another aspect of the invention, therefore, the soft precession inhibiting element is again placed between the stabilized structure and the housing. But the structure is stabilized by a spherical friction drive type of spin stabilized rotor. In this case a friction drive is rotatably mounted on the instrument and is in contact with a spherical surface on the rotor so that rotation of the drive means causes the rotor to spin. When the rotor is thusly spun its angular momentum causes the rotor to resist motion away from its spin axis. However, when the axis of the drive means changes its position relative to the rotor's spin axis the frictional forces between the drive means and the spherical surface cause the rotor to precess so that the spin axis relatively slowly realigns itself with the drive axis. If the stabilized structure realigns itself so slowly that it strikes the instrument housing, however, it is prevented from undesirably abruptly precessing by becoming embedded in the soft friction element. Hence, not only are undesirable vibrations filtered out and desired motions permitted, but the above described objectionably abrupt precession is eliminated as well.

An advantage of the instant invention is that it is a relatively simple device which is quite easily manufactured, is susceptible to large tolerances, and is therefore capable of being manufactured at low cost. Additionally, the entire structure is capable of being housed in a relatively small volume. For this reason, the structure of the instant invention is admirably suited for use in hand held instruments where compactness is a desirable feature.

A movie camera is one of the more common types of consumer products wherein instrument vibration will defeat the purposes for which the instrument is intended. For this reason, although they are suitable for use in a wide variety of instruments, preferred embodiments of the invention will herein be illustrated as being used in combination with a movie camera.

The foregoing and other objects, features, and advantages of this invention will be apparent from the following more particular description of preferred embodiments thereof, as illustrated in the accompanying drawings wherein the same reference numerals refer to the same parts throughout the various views. The drawings are not necessarily intended to be to scale, but rather are presented so as to illustrate the principles of the invention in clear form.

In the drawings:

FIG. 4 is a side view of a camera, partially broken away to illustrate the incorporation therein of an alternative embodiment of the invention;

FIG. 5 is an enlarged fragmentary sectional view of the lens stabilization structure of FIG. 4;

FIG. 6 is an enlarged fragmentary sectional view of the precession inhibitor of FIG. 5.

Figure 1:
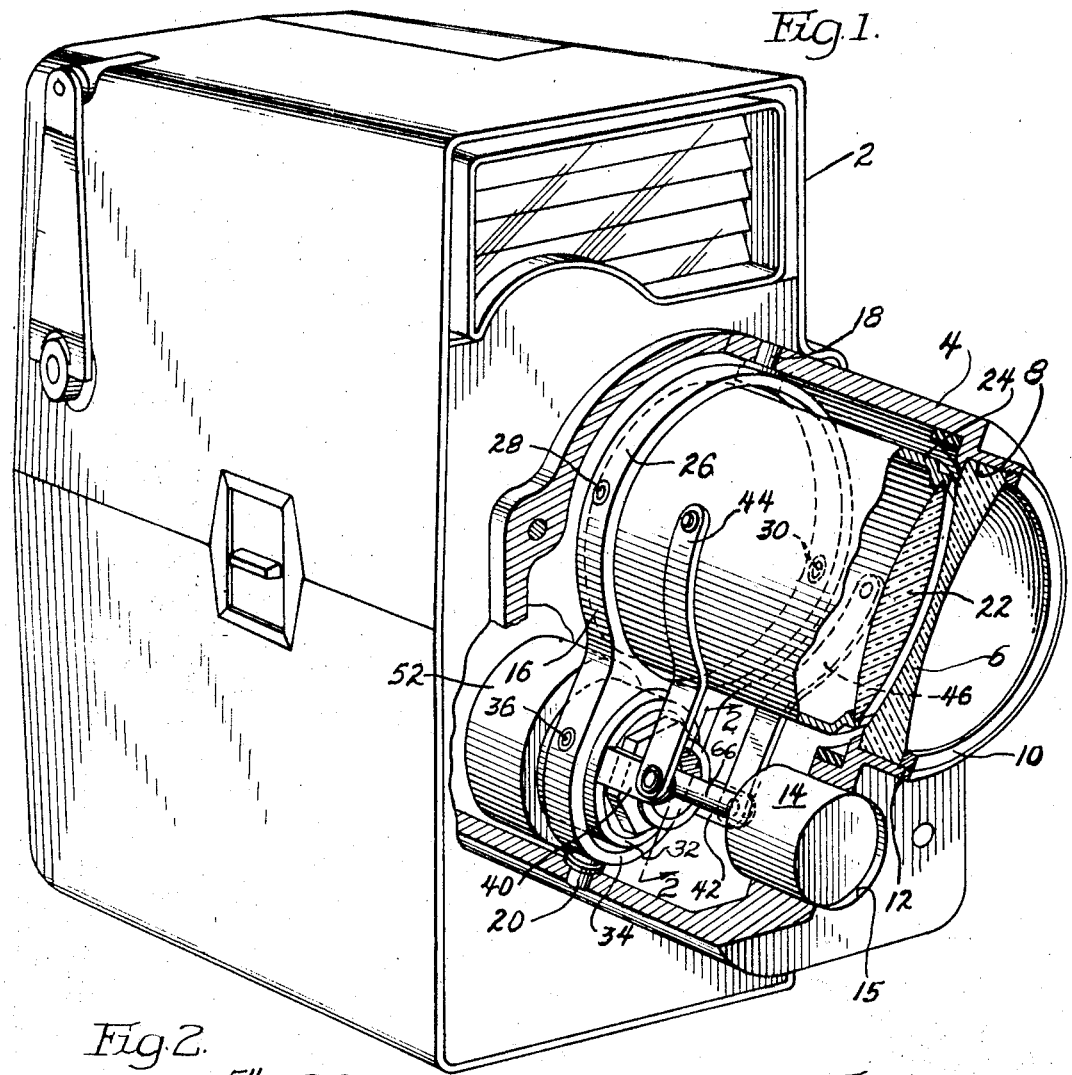
FIG. 1 is a perspective view of a camera, partially broken away to illustrate the incorporaiton therein of a preferred embodiment of the invention.

A preferred embodiment of the invention will now be described in connection with FIG. 1 wherein a camera 2 has a portion of the housing 4 thereof extending to the right. A lens 6 is retained in a recess 8 of the housing 4 by means of a retaining ring 10 which is threadably engaged with a mating portion 12 of the recess 8. A DC motor 14 is retained in an aperture 15 in a portion of the camera housing 4.

A double gimbal ring 16 is pivotally mounted in the housing 4 for rotation about an axis defined by a pair of gimbal pins 18 and 20 which are fastened to upper and lower portions of the housing 4 by any convenient means. The other ends of these gimbal pins are rotably mounted in bearings (not shown) in the double gimbal ring 16. In this manner, the double gimbal ring is adapted to pivot about the axis defined by the gimbal pins 18 and 20. It will be appreciated that although the double gimbal ring is illustrated as being pivotable about an axis off of the vertical, that the inclined mounting is merely for convenience and that the double gimbal ring can pivot about a differently inclined axis or even about the vertical without departing from the spirit and scope of the invention.

A stabilized lens 22 is mounted by any suitable means on a support member 24 which is illustrated herein as being substantially cyclindrical, but not necessarily so. The lens support member is pivotally mounted in upper ring 26 of the double gimbal ring 16 for rotation about an axis defined by gimbal pins 28 and 30 (shown dotted in FIG. 1). The gimbal pins 28 and 30 have one end thereof suitably fastened to the upper portion 26 of the double gimbal ring. The other ends of the gimbal pins 28 and 30 are rotatably mounted in bearing assemblies (not shown) of the lens support member 24. In this manner, the lens support member is pivotable about the axis defined by the gimbal pins 28 and 30. Moreover, by virtue of its connection to the double gimbal ring the lens support member 24 is also pivotable about the axis defined by the gimbal pins 18 and 20. As was similarly noted above, it will be apparent that although the gimbal pins 28 and 30 define an axis illustrated as being inclined from the horizontal that they could also be located on the horizontal or at some other inclination therefrom.

A transfer member 32 is pivotally mounted in the double gimbal ring's lower ring 34 for rotation about an axis defined by gimbal pin 36 and a corresponding gimbal pin (not shown) on the opposite side of the lower ring 34. These latter gimbal pins are mounted in the same manner as those previously described, but although they may define an axis that is either on the horizontal or inclined at some angle therefrom, their axis should be substantially parallel to the axis defined by the gimbal pins 28 and 30 as will become apparent shortly.

The transfer member 32 has two transfer arms 40 and 42 extending outwardly therefrom as shown. A pair of transfer yoke arms 44 and 46 are pinned at their lower ends to the transfer arms 40 and 42 by means of suitably mounted pin assemblies. At their upper ends the yoke arms are suitably pivotally pinned to the lens support member. In this manner, as the transfer member 32 pivots upwardly and downwardly about the axis through gimbal pin 36 its motion is transferred through the transfer arms and the yoke arms to the lens support member. Consequently, the lens support member 24 pivots about pins 28 and 30 to the same extent that the transfer member pivots about pin 36. In addition, the lens support member pivots about gimbal pins 18 and 20 to the same extent that the transfer member 32 pivots about the axis defined by those pins. Hence, the lens support member 24 follows both the pitching and the yawing motions of the transfer member 32.

Figure 3:
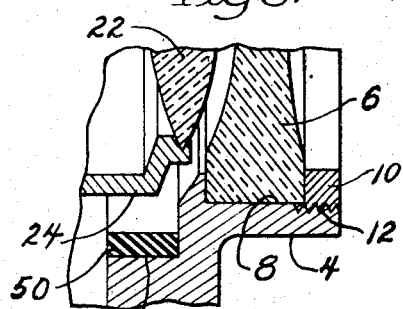
FIG. 3 is a fragmentary sectional view of a spherical friction erection mechanism used in connection with the embodiment of the invention illustrated in FIG. 1.

Referring now to FIG. 3, the camera housing 4 has a recess 48 on the internal portion thereof just behind the lens 6 (see also FIG. 1). A friction element 50 made of a soft material and having a high coefficient of friction lines the recess 48 between the lens support member 24 and the camera housing 4. This friction element may be comprised of a material sold under the trademark Plastisol, soft rubber, or some other suitable material and functions to prevent the lens support member 24, and thereby the stabilized lens 22, from moving in a direction tangent to its point of contact with the friction element. As will be described more fully shortly it is this friction element that prevents the undesirable motion of the stabilized lens 22.

Figure 2:
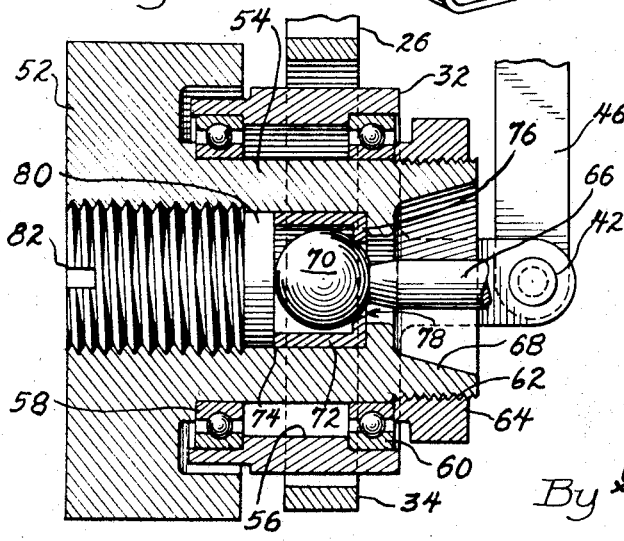
FIG. 2 is a developed sectional view taken along the line 2—2 in FIG. 1.

In FIG. 2 a rotor 52 has a support arm 54 thereof extending ot the right through a central opening 56 in the transfer member 32. The rotor 52 is rotatably mounted within the transfer member 32 by means of bearing assemblies 58 and 60. The right end of the support arm 54 is threaded at 62 to accommodate a retaining nut 64 which snugs the bearing assemblies 58 and 60 up against the rotor and transfer member respectively. The rotor, therefore, is rotatable about an axis through the center of the transfer member. Moreover, because the rotor is fastened to the transfer member 32, any pitching motion of the rotor's spin axis is transmitted through the transfer arms 40 and 42 and the transfer yoke arms 44 and 46 to the lens support member 24. Similarly, any yawing motion of the rotor's spin axis is transmitted to the lens support member by means of the three sets of gimbal pins 18–20, 28–30, and 36 and its corresponding gimbal pin (not shown). Hence, the lens 22 follows the pitching and yawing motion of the rotor 52. In addition, the rotor functions to counterbalance the weight of the lens and its support member about the gimbal axis.

As shown in FIGS. 1 and 2 the motor 14's drive shaft 66 extends from the right into a relaltively wide central opening 68 of the rotor support arm 54. A driving sphere 70 is mounted on the end of the drive shaft 66 in the center of the rotor support arm's central opening and has its center substantially in the plane defined by the above described gimbal pins. The rotor support arm's central opening is lined by a sleeve member 72 which is open at its left end 74 in FIG. 2 but closed at its right end 76 except for an aperture 78 for generously accommodating the drive shaft 66. In this manner, the drive shaft is free to become axially inclined with respect to the axis of the rotor while the rotor is spinning thereabout. A resilient plug 80 is held against the leftmost portion of the driving sphere 70 by means of a threaded insert 82 as shown in FIG. 2. With the plug 80 in this position the aperture 78 has in an inner circle of contact 82 with the driving sphere 70. By this construction, as is more fully described in U.S. Patent No. 2,815,584, entitled, "Gyro Combining Limited Freedom and Angular Rate Sensitivity," to J. R. Watson, the rotor is spun about its spin axis by the frictional forces between it and the sphere. Similarly, although the rotor is spun about its spin axis by the sphere, it is nevertheless free to move about the spherical surface so that its spin axis diverges from the sphere's drive axis. Consequently, as the rotor spins it remains relatively stable in space while the driving sphere 70 is free to move with the instrument housing 4.

Although the rotor 52 actually remains relatively stable in space as the camera jiggles, with respect to the camera it appears as through the rotor moves. Consequently, as the rotor apparently pitches about the axis through the gimbal pin 36 its relative motion is transmitted through the transfer member 32 and the transfer yoke arms to the lens support element 24 and the stabilized lens 22. Similarly, as the rotor apparently yaws about the axis through gimbal pins 18 and 20 the relative yawing motion is transmitted to the stabilized lens 22 through the double gimbal ring 16.

As previously noted the lens doublet comprised of lenses 6 and 22 forms an optical wedge. That is, parallel light rays entering the lens 6 exit from the lens 22 in rays that are parallel but collectively divergent from the axis of the lens 6 by an amount corresponding to the divergence of lens 22's axis from the axis of lens 6. In other words if a horizontal light ray passing through the center of lens 6 normally strikes the center of the camera's focal plane it continues to do so even through the lens 6 is declined off of the horizontal so long as the axis of the lens 22 is aligned with the horizontal light ray.

Hence, because the lens 22 is held stable, light rays entering the lens wedge from the right in FIGS. 1 and 3 are bent so as to be directed towards the camera's focusing lenses and focal plane irrespective of relative motion between the two lens elements. Consequently, as the camera housing is subjected to vibrations the circle of contact 82 moves across the surface of the driving sphere 70 in (FIG. 3) a distance determined by the amplitude of vibrations. At the same time, the lenses 6 and 22 have their axes displaced from each other by a corresponding angle. As noted above, therefore, the light rays entering the camera are bent an amount corresponding to the vibrations to which the camera housing is subjected. In this manner, the image appearing at the camera's focal plane remains constant irrespective of external vibrations.

To the extent that its operation has been already described the above structure performs adequately until such time as the angular displacement between the lenses 6 and 22 become so large that that lens support member 24 strikes the camera housing 4. At that time, the force of the blow upon the lens support member is transmitted to the rotor 52 causing it to abruptly precess at right angles to the direction of the blow. If the camera is vibrated upwardly and downwardly in a vertical plane in FIG. 1, for example, until the upper portion of the lens support member 24 strikes the camera housing 4 at point 84, the rotor 52 and the lens 22 following the rotor, would move rapidly to the left or right depending upon the direction of rotation of the rotor. As soon as the lens support member strikes the camera housing against the lens 22 again moves at right angles and the stability of the lens 22 is destroyed.

The insertion of the friction element 50 solves the above described problem. For example, when the camera is vibrated in a vertical plane as just described and the lens support member 24 strikes the friction element 50 at point 84, the lens support member embeds itself into the friction element to a degree sufficient to prevent the undesirable right angle precession as was described in connection with a stabilization structure that did not include the friction element. Consequently, the structure of the invention provides a means for inhibiting the undesirable procession that heretofore has accompanied stablized lenses whenever the lens housing came into contact with the instrument housing.

The structure of the invention is particularly useful in "self erecting" types of stablized instruments. That is, instruments having a characteristic that the rotor's spin axis automatically follows and strives steadily to align itself with the axis of its driving member so that the stabilized element always tends to become aligned with the instrument. Again, a movie camera is conveniently illustrative of this use for invention. When a photographer pans a movie camera, for example, it is highly desirable that the camera's stabilized lenses follow motion of the camera housing rather than maintain absolute spatial stability. During panning, therefore, it is desirable that the lens, although stable against undesired vibrations, should within practical limits follow unintentional motion of the instrument. In this case where the motion of the camera housing is relatively so slow and of such a high amplitude there is a great tendency for the stablized lens to strike the camera housing. Hence, without the instant invention's friction element panning is not very practical. When the friction element 50 is included, however, a panning operation can be satisfactorily completed even though the lens support member strikes the camera housing.

Moreover, the inclusion of the friction element 50 permits the stabilized lens to have a smaller arc through which it is permitted to swing. As has been previously noted, for example, one embodiment of the invention satisfactorily filtered out undesired vibrations with a maximum angular displacement between the lens wedge elements of only 2°. The structure of the instant invention permits a maximum lens displacement of only 2°. Hence, not only does the invention eliminate the undesirable precession that is normally attendant with stabilized elements when they strike the instrument housing, but it also eliminates the equally undesirable color fringing characteristics that are associated with optical wedges when the wedge element are subjected to more than minor axial divergence. Similarly, as will be apparent to those skilled in the art, the invention has eliminated the need for oversized stabilized lenses which have been previously required to solve the color fringing problems. In this manner, therefore, the invention also provides for a more compact stabilization structure whereby stabilized elements are more suitably adapted for hand held instruments such as movie cameras.

Thus far the invention as been described in connection with a lens that is stabilized by a separate rotor. The invention will now be described in connection with an embodiment wherein the lens and the rotor are combined into a single structure. That is, the lens itself is spun and acts as its own rotor.

In FIG. 4 a movie camera 102 has a lens stabilization system 104 mounted in a housing 106 at the forward end of the camera. A lens element 108 is mounted in a groove 110 of the housing as shown in FIG. 5 which illustrates the lens stabilization system 104 as it is broken out of the camera of FIG. 4.

A spherical lens element 112 is located on the right side of a substantially spherically surfaced member 114 in FIG. 4. In the embodiment being described the lens element 112 and the spherically surfaced member 114 have their spherical centers at point 116 which represents the intersection of a horizontal axis 118 and a vertical axis 120. The center of the spherically surfaced member is hollowed out behind the lens 112 to form a hollow cylinder 122 whose axis corresponds to the horizontal axis 118 in the figures. Hence, light entering from the right in FIG. 4, as illustrated by arrows 124, is permitted to pass through lens elements 108 and 112; through the cylindrical inner portion 122 of the spherically surfaced member 114; through additional ones of the camera's focusing lenses 126 and onto the camera's film 128 located at the focal plane 130 of the entire lens system comprised of camera lenses 126 and the stabilized lens system 104. In this manner an object 132, which it is desired to photograph, has its image 134 focused on the camera's film 128 as shown in FIG. 4.

The sphere 114 (FIG.4) has a balancing groove 136 running about its entire surface, the balancing groove being symmetrical about a line which is slightly to the left of the vertical axis 120 in FIG. 4. The inner portion of the balancing groove 138 is threaded for engagement with a balancing ring 40. The balancing ring is balanced, such as for example, by selected removal of material from a groove 146 running about the circumference thereof. Once mounted in the groove 136 of the spherically surfaced member 114 the balancing ring 140 can be screwed to the left or the right in FIG. 5 to counterbalance the weight of the spherical lens element 112. In this manner the spherically surfaced element, the balancing ring, and the lens 112 comprise a rotor assembly referred to generally as 148 which is statically and dynamically balanced about the point 116.

The camera housing has a drive support member 150 surrounding the inner camera lenses 126 and extending toward the right in FIGS. 4 and 5. Mounted about an outer surface of the drive support member 150 is a bearing assembly 154. A rotor drive member 156 has the left end 158 thereof mounted about the outer race of the bearing assembly 154 so that the rotor drive member is rotatable about the horizontal axis 118. The other end 160 of the rotor drive member engages with spherically surfaced portion 162 of the rotor assembly. The rotor drive member is substantially cylindrical and hence rests upon the spherical drive surface 162 so as to form a circle of contact about the spherical surface.

A second set of bearing assemblies 166 and 168, positioned between the outer cylindrical surface 170 and the camera housing 106, permits rotation of the rotor drive member within the housing. A suitable drive means, herein illustrated as a rubber ring 171 (FIG. 5) on a drive shaft 174 of a drive motor not shown, is used to rotate the rotor drive member 156 about its drive axis 118. Hence, the rotor drive member 156 rotates between bearing assemblies 154 and 166 of the left end in FIG. 4 and between bearing assembly 168 and its circle of contact on the spherical drive surface 162 at its other end.

In operation the rotor assembly 148 is dragged around the axis 118 by the rotor drive member. This is caused by the frictional forces between the drive means 156 and the spherical surface 162 at their circle of contact. Once the rotor assembly is brought up to a sufficient speed it acts as the rotor of a gyroscope and hence is stable in space about the axis 118 which, insofar as the rotor is concerned, is its spin axis. Consequently, after the rotor has obtained its spatial stability, motion of the camera housing, and thereby the rotor drive member 156, away from the spin axis 118 will cause the circle of contact to move across the spherical drive surface 162 so that drive axis becomes displaced from the rotor's axis. This displacement is merely represented in FIG. 5 by a displaced axis 118' representing the displaced drive axis of the rotor drive member.

Referring now to FIG. 6, the camera housing 106 has a recess 172 on the internal portion thereof just behind the lens 112 (see also FIGS. 4 and 5). A friction element 174, similar to element 50 described in connection with the former embodiment of the invention, is also made of a soft material having a high coefficient of friction. The friction element lines the recess 172 between the camera housing 106 and a stop ring 176 which protrudes from the spherical surface 162 and surrounds the inner lens element 112. As in the prior embodiment the friction element may be comprised of a material sold under the trademark Plastisol, or soft rubber, or some other suitable material and functions to prevent the lens 112 from moving in a direction tangent to its point of contact with the friction element 174.

In view of the above description, therefore, it will be appreciated that as in the former embodiment, this embodiment of the invention provides a means for inhibiting the undesirable precession that has previously been associated with spin stabilized lenses whenever such a lens came into contact with the instrument housing. In this embodiment of the invention, however, the lens itself forms a portion of the stabilization system's rotor and therefore decreases both the complexity and weight of the stabilization system. That is, both the former embodiment's transfer member and its associated structure as well as the former embodiment's separate rotor have been eliminated.

In either embodiment of the invention, however, the objectives of the invention are fulfilled. That is, the previously undesirable abrupt precession has been eliminated; a stabilized lens structure having excellent color characteristics has been provided and the previously detrimental color fringing effects of stabilized lenses have been eliminated; and the size of the stabilized lens has been held to a practical minimum whereby the structure is suitable for use in small hand held instruments. Moreover, in both embodiments of the invention the rotors are driven by the application of frictional forces to a spherical surface. Hence, as is described in the Watson patent the stabilized lenses are of the self erecting type. That is, whenever the axes of the rotors (the axis of drive shaft 66 in the former embodiment and axis 118 in the latter) become offset from the rotors' spin axes, substantially the same forces that cause the rotor to spin also cause the spin and drive axes to become relatively slowly realigned. Consequently, not only do both embodiments of the invention accomplish the above objectives, but they do so without sacrificing the instrument's ability to both filter out undesired vibrations and nevertheless have its lenses follow slow motions of the instrument such as occur during panning, for example.

For ease of illustration the action of the various embodiments has been described in connection with a movie camera. It will be apparent, however, that the invention is readily adaptable to other optical instruments as well as spin stabilized devices in general. For example, a precession inhibitor of the type described can also be used in connection with artificial horizon devices for aircraft which have previously had to be caged during certain violent aircraft maneuvers. Similarly, the invention's precession inhibitor can be used in connection with a lens stabilization system that is coupled to the objective lens of a telescope, or even a zoom binocular. An even more timely example of the invention's utility is in its use in the gunsighting systems of helicopters. When thusly employed, the structure described above permits the gunner to follow his target notwithstanding severe aircraft and gun vibrations as well as the tracking motions employed by the gunner himself.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. In a gyroscopic stabilization device the combination comprising:
   a housing;
   a spin stabilized rotor mounted in said housing so that said rotor is spatially stable with respect to motion of said housing;
   and a soft friction element having a high coefficient of friction mounted in the path of relative motion between said rotor and said housing, whereby undesirable precession of said rotor is inhibited when said rotor contacts said friction element.

2. A lens stabilization system comprising:
   a housing;
   a spin stabilized rotor mounted in said housing so that said rotor is spatially stable with respect to motion of said housings;
   a lens forming a part of said rotor and spatially stable therewith;
   and a soft friction element having a high coefficient of friction mounted in the path of relative motion between said rotor and said housing, whereby undesirable motion of said rotor and thereby said lens is inhibited when said rotor contacts said friction element.

3. A lens stabilization system comprising:
   a housing;
   a rotor mounted in said housing and comprised of a lens and a spherically surfaced member;
   a rotatable drive means contacting a portion of said spherical surface;
   means to rotate said drive means whereby the friction between said drive means and said spherical surface causes said rotor to rotate, said rotor thereby being spatially stable with respect to motion of said housing;
   and a soft friction element having a high coefficient of friction mounted in the path of relative motion between said rotor and said housing, whereby undesirable precession of said rotor is inhibited when said rotor contacts said friction element.

4. A lens stabilization system comprising:
   a housing;
   a rotor mounted in said housing, said rotor being comprised of a lens and a spherically surfaced member;
   a rotatable drive means contacting a portion of said spherical surface and substantially surrounding said spherical surface at said portion of contact;
   means to rotate said drive means whereby the friction between said drive means and said spherical surface causes said rotor to rotate whereby said rotor is spatially stable with respect to motion of said housing;
   and a soft friction element having a high coefficient of friction mounted in the path of relative motion between said rotor and said housing, whereby undesirable precession of said rotor is inhibited when said rotor contacts said friction element.

5. In a gyro stabilized optical instrument, the combination comprising:
   a housing;
   a first lens mounted in said housing;
   a spin stabilized structure mounted in said housing so said spin stabilized structure is spatially stable with respect to motion of said housing;
   a rotor located on said spin stabilized structure;
   said spin stabilized structure further including a second lens located within said housing so that said first and second lenses form an optical wedge;
   and a soft friction element having a high coefficient of friction mounted in the path of relative motion between said rotor and said housing whereby undesirable motion of said second lens due to precession of said rotor is inhibited when said rotor contacts said friction element.

6. The apparatus of claim 5 wherein said second lens is located on and spins with said rotor.

7. In a gyro stabilized optical instrument, the combination comprising:
a housing;
a first lens mounted in said housing;
a rotor mounted in said housing and comprised of a second lens and a spherically surfaced member, said second lens located within said housing so that said first and second lenses form an optical wedge;
a rotatable drive means contacting a portion of said spherical surface;
means to rotate said drive means whereby the friction between said drive means and said spherical surface causes said rotor to rotate, said rotor thereby being spatially stable with respect to motion of said housing;
and a soft friction element having a high coefficient of friction mounted in the path of relative motion between said rotor and said housing, whereby undesirable precession of said rotor is inhibited when said rotor contacts said friction element.

8. The apparatus of claim 7 wherein said rotatable drive means substantially surrounds said spherical surface at said portion of contact.

9. In a gyro stabilized optical instrument, the combination comprising:
a housing;
a first lens mounted in said housing;
a rotor;
drive means rotatable about a drive axis to drive said rotor about a spin axis, said rotor being adapted so that its spin axis is free to diverge from said drive axis by pivoting about first and second motion axes which intersects at a point on said drive axis;
a transfer member coaxial with said spin axis of said rotor and adapted to move with said rotor as said rotor pivots about said first and second motion axes, but stationary with respect to the rotor's motion about said spin axis;
a gimbal suspension means located within said housing;
first connecting means connecting said transfer member to said gimbal suspension means so that motion of said rotor about said first motion axis is transmitted to said gimbal suspension means;
a lens support member having an axis thereof offset from said spin axis of said rotor;
a second lens located within said housing so that said first and second lenses form an optical wedge, said second lens being mounted on said lens support member coaxially with said offset axis;
second connecting means connecting said lens support member to said gimbal suspension means so that the offset axis of said second lens follows motion of said rotor about said first motion axis;
third connecting means connecting said transfer member to said lens support means for transferring motion of said rotor about said second axis to said offset axis of said second lens, whereby said second lens is spatially stable with respect to motion of said housing;
and a soft friction element having a high coefficient of friction mounted in the path of relative motion between said second lens and said housing, whereby undesired motion of said second lens is inhibited when said second lens contacts said friction element.

10. In a moving picture camera which is adapted to focus light rays from an object on to a film station, the combination comprising:
a camera housing which includes an object portion and an image portion;
a first lens mounted in said object portion of said housing, said film station being at said image portion of said housing;
a spin stabilized structure mounted in said housing so that said spin stabilized structure is spatially stable with respect to motion of said housing;
a second lens located on the said spin stabilized structure so that said first and second lenses form an optical wedge whereby an image from an object is focused at said film station irrespective of relative motion between said lenses;
and a soft friction element having a high coefficient of friction mounted in the path of relative motion between said spin stabilized structure and said housing whereby undesirable motion of said second lens due to precession of said stabilized structure is inhibited when said spin stabilized structure contacts said friction element.

11. The apparatus of claim 10 wherein said spin stabilized structure includes a rotor and said soft friction element is mounted in the path of relative motion between said rotor and said housing.

12. The apparatus of claim 11 wherein said second lens is located on and rotates with said rotor.

13. In a moving picture camera which is adapted to focus light rays from an object onto a film station, the combination comprising:
a camera housing which includes an object portion and an image portion;
a first lens mounted in said object portion of said housing, said film station being at said image portion of said housing;
a rotor mounted in said housing and comprised of a second lens and a spherically surfaced member, said rotor being located within said housing so that said first and second lenses form an optical wedge whereby an image from an object is focused at said film station irrespective of relative motion between said lenses;
a rotatable drive means contacting a portion of said spherical surface;
means to rotate said drive means whereby the friction between said drive means and said spherical surface causes said rotor to rotate, said rotor thereby being spatially stable with respect to motion of said housing;
and a soft friction element having a high coefficient of friction mounted in the path of relative motion between said rotor and said housing, whereby undesirable precession of said rotor is inhibited when said rotor contacts said friction element.

14. The apparatus of claim 13 wherein said rotatable drive means substantially surrounds said spherical surface at said portion of contact.

15. In a moving picture camera which is adapted to focus light rays from an object onto a film station, the combination comprising:
a camera housing which includes an object portion and an image portion;
a first lens mounted in said object portion of said housing, said film station being at said image portion of said housing;
a spin stabilized rotor mounted in said housing so that said rotor is spatially stable with respect to motion of said housing;
a second lens located within said housing so that said first and second lenses form an optical wedge whereby an image from an object is focused at said film station irrespective of relative motion between said lenses;
means connecting said second lens to said rotor, said second lens being stabilized thereby so that said second lens is also spatially stable with respect to motion of said housing;
and a soft friction element having a high coefficient of friction mounted in the path of relative motion between said second lens and said housing whereby undesirable motion of said second lens is inhibited when said second lens contacts said friction element.

16. In a moving picture camera which is adapted to focus light rays from an object onto a film station and includes a gyroscopic stabilization device of the type in which a rotor is driven by frictional forces between the rotor and an associated spherical friction drive member located within said rotor, the combination comprising:

a camera housing which includes an object portion and an image portion;

a first lens mounted in said object portion of said housing, said film station being at said image portion of said housing;

means to rotate said spherical friction drive member so that said rotor is spatially stable with respect to motion of said housing;

a second lens located within said housing so that said first and second lenses form an optical wedge whereby an image from an object is focused at said film station irrespective of relative motion between said lenses;

means connecting said rotor to said second lens so that said second lens is also spatially stable with respect to motion of said housing;

and a soft friction element having a high coefficient of friction mounted in the path of relative motion between said second lens and said housing, whereby undesired motion of said second lens is inhibited when said second lens contacts said friction element.

17. In a moving picture camera which is adapted to focus light rays from an object onto a film station, the combination comprising:

a camera housing which includes an object portion and an image portion;

a first lens mounted in said object portion of said housing, said film station being at said image portion of said housing;

a rotor;

drive means rotatable about a drive axis to drive said rotor about a spin axis, said rotor being adapted so that its spin axis is free to diverge from said drive axis by pivoting about first and second motion axes which intersect at a point on said drive axis;

a transfer member coaxial with said spin axis of said rotor and adapted to move with said rotor as said rotor pivots about said first and second motion axes, but stationary with respect to the rotor's motion about said spin axis;

a gimbal suspension means located within said housing;

first connecting means connecting said transfer member to said gimbal suspension means so that motion of said rotor about said first motion axis is transmitted to said gimbal suspension means;

a lens support member having an axis thereof offset from said spin axis of said rotor;

a second lens mounted on said lens support member coaxially with said offset axis, said lens support member being located within said housing so that said first and second lenses form an optical wedge whereby an image from an object is focused at said film station irrespective of relative motion between said lenses;

second connecting means connecting said lens support member to said gimbal suspension means so that the offset axis of said second lens follows motion of said rotor about said first motion axis;

third connecting means connecting said transfer to said lens support means for transferring motion of said rotor about said second motion axis to said offset axis of said second lens, whereby said second lens is spatially stable with respect to motion of said housing;

and a soft friction element having a high coefficient of friction mounted in the path of relative motion between said second lens and said housing, whereby undesired motion of said second lens is inhibited when said second lens contacts said friction element.

References Cited

UNITED STATES PATENTS

| | | | |
|---|---|---|---|
| 1,402,064 | 1/1922 | Gray | 88—1 |
| 1,586,070 | 5/1926 | Cooke | 95—12.5 |
| 1,586,071 | 5/1926 | Cooke | 95—12.5 |
| 1,634,950 | 7/1927 | Lucian | 95—12.5 |
| 1,860,230 | 5/1932 | Brown | 73—504 |
| 2,423,269 | 7/1947 | Summers | 33—204 |
| 2,457,150 | 12/1948 | Herondelle | 74—5.45 X |
| 2,829,557 | 4/1958 | Jensen | 74—5.46 X |
| 2,959,088 | 11/1960 | Rantsch | 88—1 |

NORTON ANSHER, *Primary Examiner.*

M. H. HAYES, *Assistant Examiner.*

U.S. Cl. X.R.

350—16; 74—5.4